United States Patent
Chattopadhyay et al.

(10) Patent No.: US 10,168,192 B2
(45) Date of Patent: Jan. 1, 2019

(54) DETERMINING VALUES OF ANGULAR GAUGES

(71) Applicant: INTEL CORPORATION, Santa Clara, CA (US)

(72) Inventors: Rita Chattopadhyay, Chandler, AZ (US); Anne M. Russell, Cedar Park, TX (US); Nikhil Jog, Chandler, AZ (US); David M. Bayba, Chandler, AZ (US); Ravindra V. Narkhede, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 116 days.

(21) Appl. No.: 14/979,016

(22) Filed: Dec. 22, 2015

(65) Prior Publication Data

US 2017/0178329 A1    Jun. 22, 2017

(51) Int. Cl.
| | | |
|---|---|---|
| *G06K 9/00* | (2006.01) | |
| *G01D 13/22* | (2006.01) | |
| *G01B 11/26* | (2006.01) | |
| *G06T 7/00* | (2017.01) | |
| *G06T 7/70* | (2017.01) | |

(52) U.S. Cl.
CPC ............ *G01D 13/22* (2013.01); *G01B 11/26* (2013.01); *G06T 7/00* (2013.01); *G06T 7/70* (2017.01); *G06T 2207/10016* (2013.01); *G06T 2207/20036* (2013.01); *G06T 2207/30108* (2013.01)

(58) Field of Classification Search
CPC .................. G01B 11/26; G01D 13/22; G06T 2207/30108
USPC ......................................... 382/100
See application file for complete search history.

(56) References Cited

U.S. PATENT DOCUMENTS

| | | |
|---|---|---|
| 5,335,177 A | 8/1994 | Boiteau et al. |
| 5,542,280 A | 8/1996 | Markow et al. |
| (Continued) | | |

FOREIGN PATENT DOCUMENTS

KR    20060073746 A    6/2006

OTHER PUBLICATIONS

Anne M. Russell et al. "Robust Monitoring of Gauges", U.S. Appl. No. 15/283,146, filed Sep. 30, 2016, 39 pages.
(Continued)

*Primary Examiner* — Andrew Moyer
(74) *Attorney, Agent, or Firm* — Schwabe, Williamson & Wyatt, P.C.

(57) ABSTRACT

In various embodiments, an angular gauge reporting system ("AGRS") may determine one or more values from an image of an angular gauge. The AGRS may receive one or more images of the gauge and develop an angular map to determine values indicated by the gauge. The AGRS may identify numbers in the image to generate the angular map. The AGRS may determine a center for the angular gauge. The AGRS may determine numerical values by processing capture images of the angular gauge though angular or linear interpolation of values. By generating the angular map prior to later determination of values, the AGRS may provide for determination of numerical values without requiring repetition of actions which may be computationally complex or resource intensive. Other embodiments may be described and/or claimed.

24 Claims, 10 Drawing Sheets

Angular Gauge Reporting System

(56) References Cited

U.S. PATENT DOCUMENTS

| | | | |
|---|---|---|---|
| 6,798,895 B1* | 9/2004 | Takahashi | G06K 9/2054 382/101 |
| 2004/0234101 A1 | 11/2004 | Lee et al. | |
| 2006/0136177 A1* | 6/2006 | Patanian | G05B 23/0213 702/187 |
| 2007/0236366 A1 | 10/2007 | Gur et al. | |
| 2008/0148877 A1 | 6/2008 | Sim | |
| 2009/0190795 A1* | 7/2009 | Derkalousdian | G06K 9/00 382/100 |
| 2009/0322884 A1* | 12/2009 | Bolick | G01D 4/008 348/160 |
| 2013/0050498 A1 | 2/2013 | Kennedy et al. | |
| 2013/0070099 A1* | 3/2013 | Gellaboina | G06K 9/00 348/160 |
| 2013/0085638 A1 | 4/2013 | Weinmann et al. | |
| 2014/0139682 A1 | 5/2014 | Lye et al. | |
| 2014/0286580 A1 | 9/2014 | Kennedy et al. | |
| 2017/0089692 A1* | 3/2017 | Chattopadhyay | G01B 11/26 |

OTHER PUBLICATIONS

Rita Chattopadhyay et al. "Monitoring of Gauges", U.S. Appl. No. 14/864,635, filed Sep. 24, 2015, 38 pages.
International Search Report and Written Opinion dated Mar. 3, 2017 for International Application No. PCT/US2016/062079, 15 pages.
International Search Report and Written Opinion dated Nov. 23, 2017 for International Application No. PCT/US2017/046981, 13 pages.
International Search Report and Written Opinion dated Nov. 30, 2016 for International Application No. PCT/US2016/048429, 13 pages.
International Preliminary Report on Patentability dated Apr. 5, 2018 for International Application No. PCT/US2016/048429, 10 pages.
Non-Final Office Action dated Nov. 15, 2018 for U.S. Appl. No. 15/283,146, 48 pages.
Non-Final Office Action dated Nov. 21, 2018 for U.S. Appl. No. 14/864,635, 50 pages.

* cited by examiner

DETERMINING VALUES OF ANGULAR GAUGES

TECHNICAL FIELD

The present disclosure relates to the field of data processing, in particular, to apparatuses, methods and storage media associated with automated determination of values displayed by angular gauges.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In various scenarios, including in the manufacturing, construction, environmental and other industries, analog gauges are used to display values for measurement and monitoring. In particular, some of these analog gauges may be angular gauges, in which a needle may be mounted on a rotating spindle, where it may hinge. The spindle may be rotated around this hinge point to a particular degree, causing the needle to rotate as well. The angular gauge may also include a set of markings to which the needle may point to indicate a particular value. In various scenarios, such angular gauges may be desired to be read from a distance. For example, the angular gauge may be located in a difficult-to-reach location or in a dangerous space, such as an excessively noisy space or one that is subjected to dangerous chemicals or radiation.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
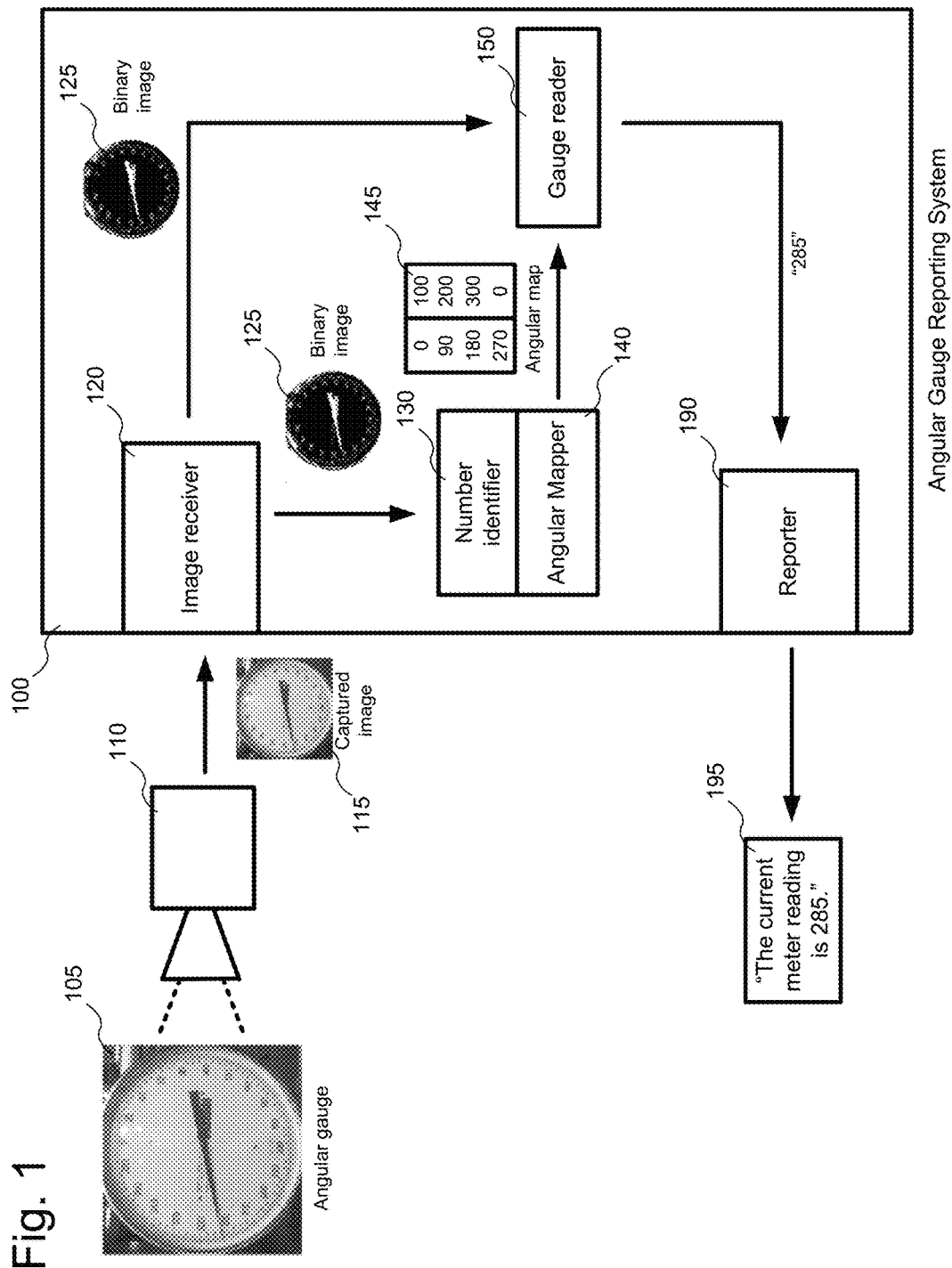
FIG. 1 illustrates example components and information flows of an angular gauge reporting system, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

In various embodiments, an angular gauge reporting system ("AGRS") may be configured to determine one or more values indicated by an angular gauge from an image of the angular gauge. In various embodiments, the AGRS may be configured to receive one or more images of an angular gauge and to develop an angular map which may be used by the AGRS to determine values later indicated by the gauge. In various embodiments, the AGRS may be configured to identify numbers in the image and to generate the angular map based on two or more of these numbers. The AGRS may identify the numbers through identification of connected components in the image and grouping of connected components into labels. The AGRS may be configured to select labels which are likely to be numbers from the connected components and to perform optical character recognition (OCR) on these labels in order to determine the numbers on the angular gauge. In various embodiments, the AGRS may also determine a center for the angular gauge;

the AGRS may determine that the center of the gauge is the center of the image, or may determine a different center point, depending on angular gauge.

After determination of the angular map, the AGRS may be configured to determine numerical values which are displayed by the angular gauge by processing images captured of the angular gauge. In various embodiments, the AGRS may determine numerical values though angular or linear interpolation of values. In various embodiments, the AGRS may thus provide for determination of numerical values indicated by an angular gauge, such as to remotely identify values from the gauge. Further, by generating the angular map prior to later determination of values, the AGRS may provide for determination of numerical values without requiring repetition of actions which may be computationally complex or resource intensive. For example, by generating the angular map, including numbers identified from the angular gauge, prior to later identification of values represented by the gauge, the AGRS may avoid repetition of tasks such as OCR or center finding, which may slow down value determination if repeated every time.

Referring now to FIG. 1, components and information flows of an AGRS 100 are shown in accordance with various embodiments. It may be noted that, while particular processing, data collection, and storage components are illustrated, as well as particular information flows between these components, in various embodiments, the AGRS 100 may include other components or flows and/or may omit one or more components or flows illustrated in FIG. 1. In various embodiments, the illustrated components may be implemented in hardware and/or software, and may be configured to operate on computing devices of various form factors, such as described below.

In various embodiments, the AGRS 100 may include an image receiver 120 ("IR 120"), which may be configured to receive one or more captured images or video 115 of an angular gauge 105 captured by a camera 110. In other embodiments, the camera 110 may be included in the AGRS 100 or may be included in another device or computer system. In various embodiments the camera 110 may include, but is not limited to, various types of cameras or image-capture devices, including video camera and still camera, and may exist as a standalone image-capture device or as part of another device, such as, for example, a laptop, tablet, mobile phone, or other mobile device. In various embodiments, the IR 120 may be configured to receive the image and/or video through various wired and/or wireless techniques, such as, but limited to, direct wired connection, USB, WiFi™, Ethernet, TCP/IP, etc. In the interest of simpler description, the captured images or video 115 will be referred to herein as "captured image 115". However, it may be understood that the IR 120 may receive multiple images 115 and/or may receive video. When receiving video, the IR 120 may be configured to generate one or more captured images 115 from the video, such as by sampling the video at a regular or irregular interval.

In various embodiments, the IR 120 may be configured to provide a binary image 125 based on the received image 125 to one or more components of the AGRS 100 for further processing. In various embodiments, the IRE 120 may be configured to generate the binary image 125 through generation of a grayscale version of the captured image 115, followed by thresholding of the grayscale image to generate the binary image 125. The IR 120 may also be configured to crop the binary image 125 to a circular image, or other shaped image, in order to reduce an amount of extra image or image noise in order to support effective reading of the angular gauge 105. In various embodiments, in order to support such cropping, as well as other techniques described herein, the IR 120 may be configured to identify one or more circles in the binary image 125 which may include the image of the angular gauge 105. In various embodiments, the IR 120 may be configured to identify one or more circles which include the angular gauge image through the use of a Hough transformation technique, as may be understood.

In various embodiments, the binary image 125 may be provided to a number identifier 130 ("NI 130"). In various embodiments, the NI 130 may be configured to identify one or more numbers which are shown on the angular gauge 105, and therefore on the captured image 115 and the binary image 125. In various embodiments, the NI 130 may be configured to identify one or more connected components ("CCs") of connected image data in the binary image 125. In various embodiments, connected components may include regions of adjacent pixels which may share a same or similar set of intensity values. The NI 130 may also be configured to label the CCs to generate connected component labels ("CCLs"). These CCLs may be grouped together into larger CCLs, which may, in turn, be used for possible identification as numbers. In various embodiments, techniques for identifying CCs and CCLs may be known; for example the R language and associated frameworks may include tools for identification of CCs and CCLs.

The NI 130 may also, in various embodiments, select one or more CCLs as likely to be numbers based on analysis of the CCLs. The NI 130 may also be configured to perform OCR on the selected CCLs in order to identify numbers displayed on the angular gauge. In various embodiments, the NI 130 may also be configured to filter identified numbers which are outside of known minimum or maximum values for the angular gauge 105, such as if the gauge displays numbers that are unlikely or impossible for the gauge needle to actually indicate.

In various embodiments, the AGRS 100 may also include an angular mapper 140 ("AM 140"), which may generate an angular map 145 for the angular gauge 105. In various embodiments, the AM 140 may generate an angular map 145 to include information about one or more numbers identified by the NI 130. In various embodiments, the angular map 145 may include, for one or more of the numbers, positional information that may allow the AGRS 100 to determine numerical values for future captured images 115 captured by the camera 110. In various embodiments, this positional information may include one or more locations for numbers in the binary image 125. In other embodiments, this positional information may include, for respective numbers, respective angles at which the need of the angular gauge 105 may be rotated to when pointing at the respective numbers. Thus, in the illustrated example, the angular map 145 includes four numerical values (e.g., 0, 100, 200, and 300) along with respective angles at which the needle of the angular map 145 may point when indicating the value (e.g., 270, 0, 90, and 180, degrees respectively). In alternate embodiments, the angles may be expressed in other units, such as radians. As discussed herein, in various embodiments, determination of association of particular needle angles to numerical values may, in various embodiments be performed either at the time of development of the angular map 145, or later, when determining a value indicated by the angular gauge 105.

In various embodiments, the AGRS 100 may also include a gauge reader 150 ("GR 150"), which may be configured to receive a binary image 155 of the angular gauge as well as the angular map 145 and to produce a numerical value (such, in the example of FIG. 1, "285") for reporting outside of the AGRS 100. In various embodiments, the binary image 155 may be produced by the IR 120 in a similar manner to the binary image 125; the different reference numbers are used herein to more clearly show that the GR 150 may process different images than those used at an earlier time to generate the angular map 145. In various embodiments, the GR 150 may be configured to determine values based on linear or angular interpolation based on the angular map 145, as described below. In various embodiments, the GR 145 may provide the determined value to a reporter 190, which may provide a report 195 of the determined value. In various embodiments, this report 195 may include various forms, such as textual reports, image-based reports, audio reports, etc.

Figure 2:
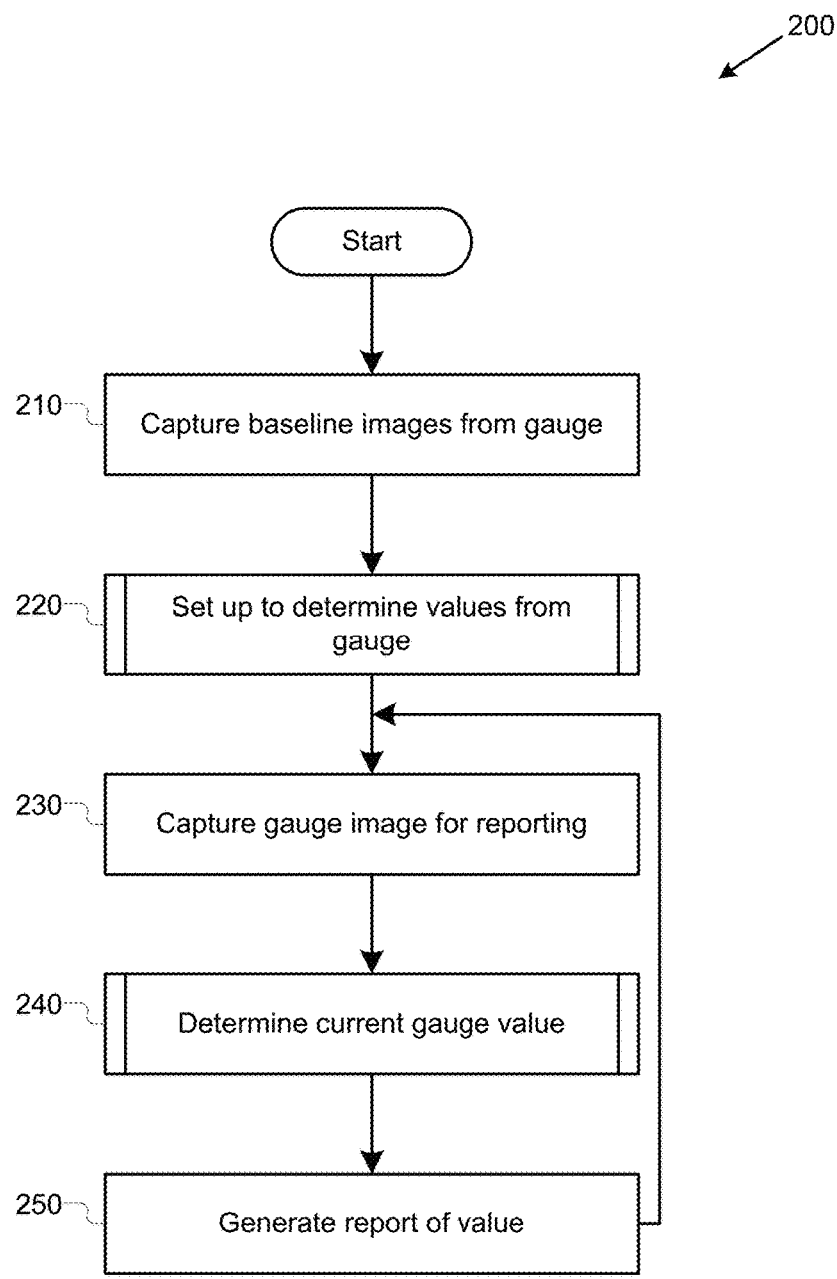
FIG. 2 illustrates an example process for the angular gauge reporting system to report values from an angular gauge, in accordance with various embodiments.

Referring now to FIG. 2, an example process 200 for the AGRS 100 to report values from an angular gauge is illustrated in accordance with various embodiments. While FIG. 2 illustrates particular operations in a particular order, in various embodiments the operations may be combined, split into parts, and/or omitted. The process may begin at operation 210, where baseline images for the angular gauge 105 may be captured, such as by the camera 110. In various embodiments, during operation 210, the camera 110 may be placed such that stable and consistent images may be captured of the angular gauge 105. In various embodiments it may be desirable to capture stable captured images 115 of the angular gauge so that both the numbers on the angular gauge 105 can be viewed in a consistent position when future captured images 115 are captured. In alternate embodiments, images captured from different view angles may be provided and used instead. Additionally, it may be desired to take stable captured images 115 such that the hinge point of the needle of the angular gauge 105 stays in a consistent position in captured images 115 so that associations between angles of the needle and numerical values may be consistent between captured images 115. In various embodiments, at 210, the angular gauge 105 and camera 110 may also be set up with lighting that provides a consistent captured image 115 such that any future processing of captured images 115 may provide consistent results.

Next, at operation 220, the AGRS 100 may be set up to determine values from the angular gauge 105. In various embodiments, operation 220 may include the identification of one or more numbers on the angular gauge 105 as well as generation of an angular map 145. Particular embodiments of the process of operation 220 may be described below with reference to process 300 of FIG. 3. Next, at operation 230, the camera 110 may capture a captured image 115 for determination and reporting of the currently displayed by the angular gauge. At operation 240, the GR 150 may determine a numerical value displayed by the angular gauge 105 as captured image 115. Particular embodiments of the process of operation 240 may be described below with reference to processes 700 of FIG. 7 and 800 of FIG. 8. Finally, at operation 250, a report 195 of the determined value for the angular gauge 105 may be generated (e.g., by reporter 190). As discussed above, in various embodiments, at operation 250, the reporter 190 may generate one or more of a text report, an image report, an audio report and/or may trigger a mechanical or programmatic action in response to the numerical value determined by the GR 150. Other reporting techniques may also be practiced. After generation of the report 195, the process may repeat for one or more captured images 115 of the angular gauge 105.

Figure 3:
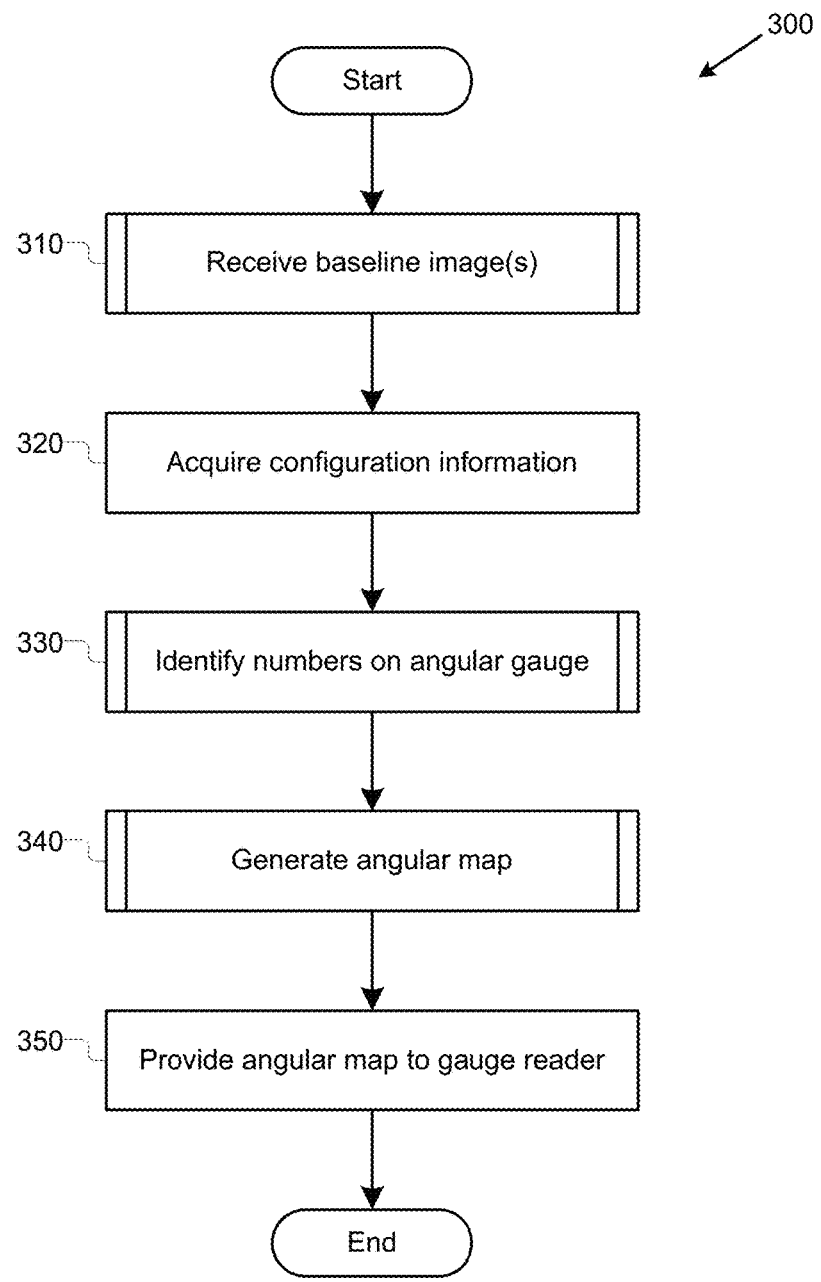
FIG. 3 illustrates an example process for setting up the angular gauge reporting system to determine gauge values, in accordance with various embodiments.

Referring now to FIG. 3, an example process 300 for setting up the AGRS 100 to determine gauge values is illustrated in accordance with various embodiments. In various embodiments, process 300 may be performed to implement, in whole or in part, operation 220 of process 200 of FIG. 2. While FIG. 3 illustrates particular operations in a particular order, in various embodiments the operations may be combined, split into parts, and/or omitted. The process may begin at operation 310, where the IR 120 may receive one or more baseline captured images 125 of the angular gauge 105 captured by camera 100. Particular embodiments of the process of operation 310 may be described below with reference to process 400 of FIG. 4. Next, at operation 320, the AGRS 100 may acquire configuration information for the angular gauge 105. For example, at operation 320, the AGRS 100 may acquire minimum or maximum values for the angular gauge 105. In other embodiments, the AGRS 100 may acquire what type of angular gauge 105 is being monitored or other features of the angular gauge 105. In some embodiments, the AGRS 100 may be configured to acquire information about the location of the hinge of the needle of the angular gauge 105, which may facilitate later determination of the angular map 145. In various embodiments, the configuration information may be acquired through various techniques, including one or more of: entry of configuration information by a user, use of a configuration file, use of an online configuration information resource, access of a database or other structure in which configuration information is stored, etc.

Next, at operation 330, the NI 130 may identify one or more numbers on the angular gauge 105 from the baseline captured images 115. Particular embodiments of the process of operation 330 may be described below with reference to process 500 of FIG. 5. At operation 350, the AM 140 may generate an angular map 145 from the baseline captured images 115. Particular embodiments of the process of operation 340 may be described below with reference to process 600 of FIG. 6. After generation of the angular map 145, at operation 350, the angular map 145 may be provided to the GR 150 for later use in determining values indicated by the angular gauge 105. The process may then end.

Figure 4:
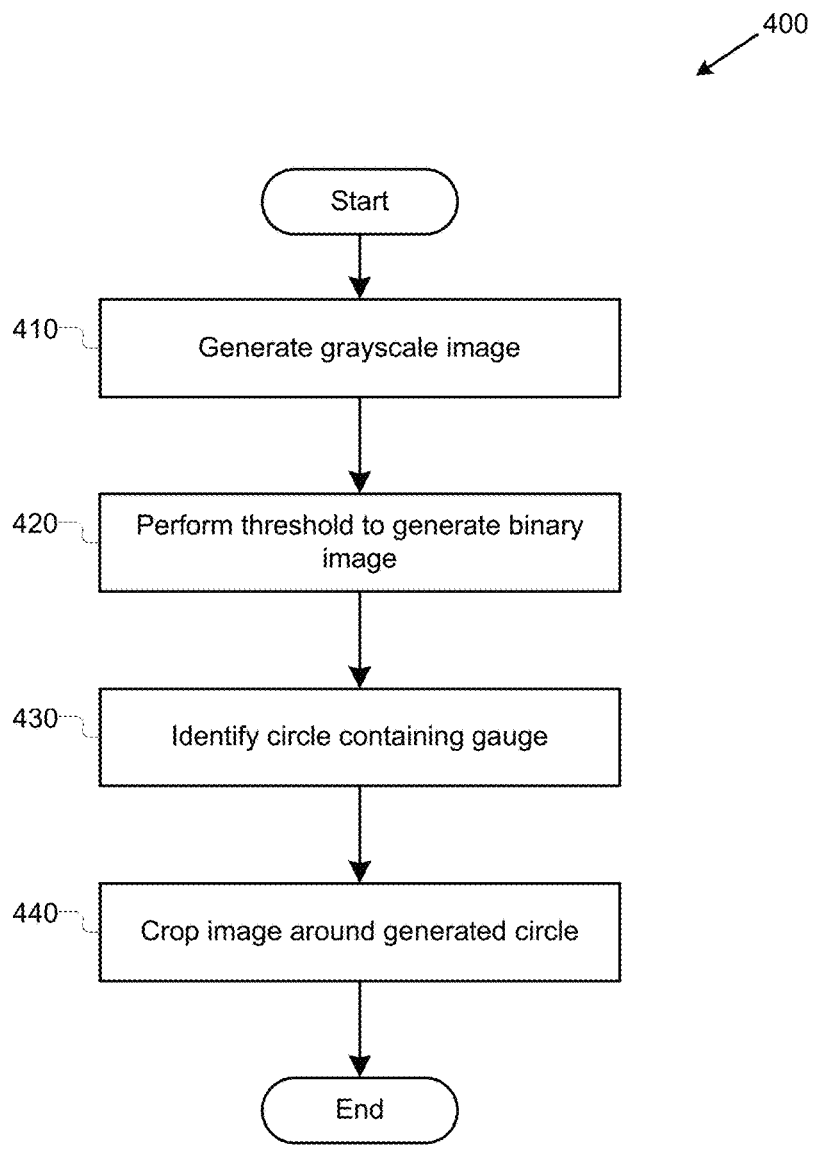
FIG. 4 illustrates an example process for receiving and processing images, in accordance with various embodiments.

Referring now to FIG. 4, an example process 400 for receiving and processing images is illustrated in accordance with various embodiments. In various embodiments, process 400 may be performed to implement, in whole or in part, operation 310 of process 300 of FIG. 3, operation 710 of process 700 of FIG. 7, operation 810 of process 800 of FIG. 8. While FIG. 4 illustrates particular operations in a particular order, in various embodiments the operations may be combined, split into parts, and/or omitted. The process may begin at operation 410, where the IR 120 may generate a grayscale image from the captured image 115, such as by using luminosity coefficients, as may be understood. At operation 420, after generating a grayscale image, the IR 120 may generate a binary image 125 from the grayscale image, such as using threshold values. In various embodiments, a moments method may be used to establish an auto-threshold value, as may be understood. In other embodiments, other methods of generating the binary image 125 may be utilized.

Next, at operation 430, the IR 120 may identify a circle containing the angular gauge 105 in the binary image 125. In various embodiments, the circle may be identify using a Hough transform, as may be understood. In some embodiments, multiple circles may be generated and one circle may be selected from amongst those generated, such as by selecting the smallest circle that entirely contains the image of the gauge 105. In various embodiments, if the image includes multiple gauges, multiple circles may be identified and one of them may be chosen as including the gauge which is to be analyzed. Next, at operation 440, the binary image 125 may be cropped around the circle, such that background images/noise may be removed. In some embodiments, the binary image may be cropped to a circle with a radius of 1.15*R, where R is the radius computed during the circle identification performed at operation 430. In such embodiments, by including a small amount of additional image, the IR 120 may better support future image processing by avoiding removal of useful image information. After operation 440, the process may end.

Figure 5:
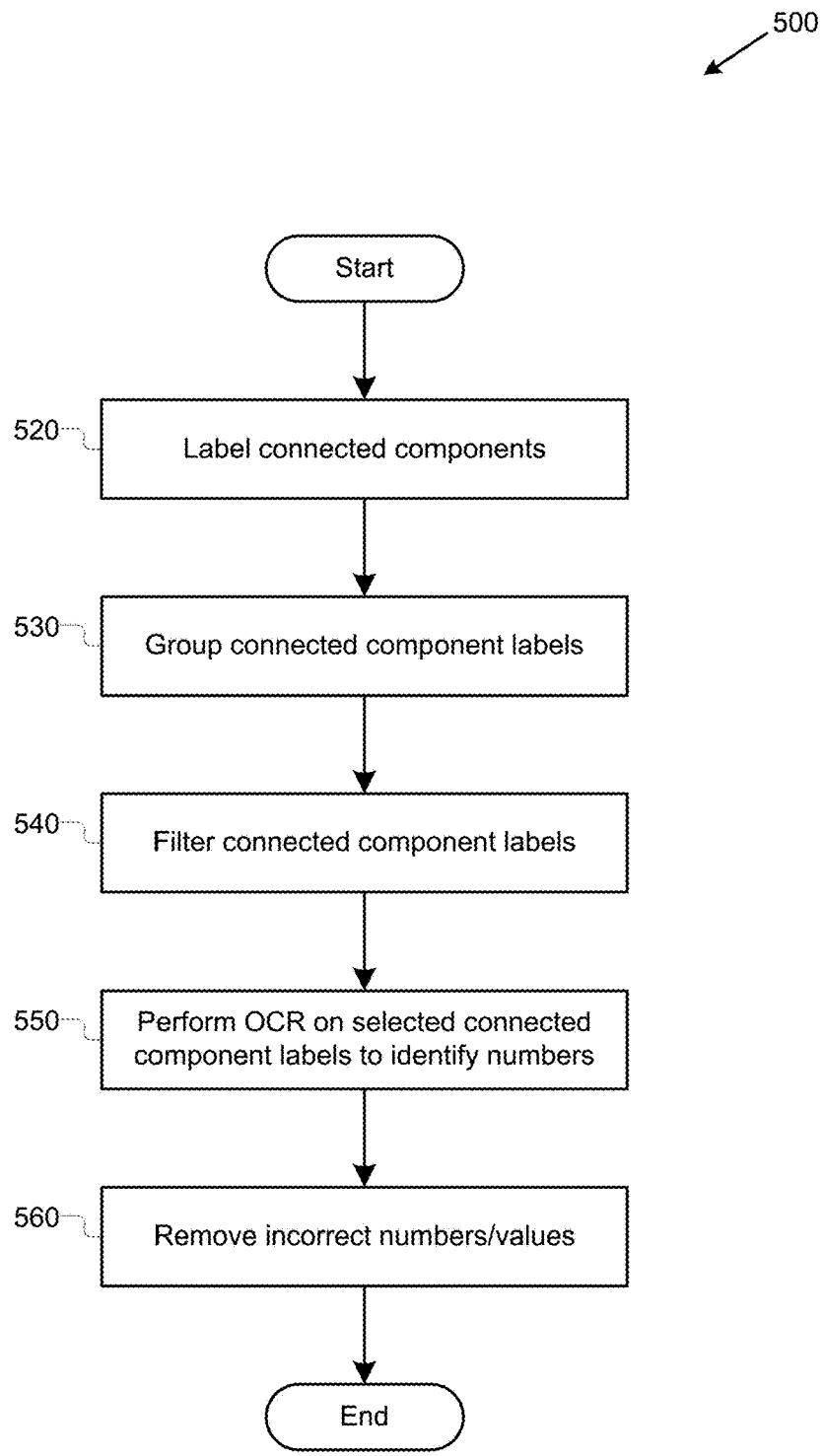
FIG. 5 illustrates an example process for identifying numbers on an angular gauge, in accordance with various embodiments.

Referring now to FIG. 5, an example process for identifying numbers on an angular gauge is illustrated in accordance with various embodiments. In various embodiments, process 500 may be performed to implement, in whole or in part, operation 330 of process 300 of FIG. 3. While FIG. 5 illustrates particular operations in a particular order, in various embodiments the operations may be combined, split into parts, and/or omitted. The process may begin at operation 520, where connected components in the binary image 125 may be labeled by the NI 130. In various embodiments, the connected components may be identified and labeled using known techniques such as, for example, using tools of the R programming language. Next, at operation 530, connected component labels ("CCLs") may be grouped to create larger CCLs, such as to group together connected components for individual digits of a number. For example, if a number "380" is in a binary image 125, at operation 520, the NI 130 may identify separate CCLs for the "3", the "8", and the "0". Thus, at operation 530, the NI 130 may group these CCLs together to generate a CCL for the entire number. In various embodiments, the NI 130 may utilize various techniques for grouping CCLs. In some embodiments, CCLs may be grouped if they are one or more of: are aligned vertically (e.g., aligned ±0.75*height of each other), are of similar height (e.g., having height ±0.25*height of each other), and/or are close together (e.g., located ±0.5*(median width)), may be grouped together. In other embodiments, other techniques and/or thresholds may be utilized for grouping of CCLs.

Next, at operation 540, the NI 130 may filter through the CCLs to identify those CCLs which are likely to contain numbers from the angular gauge 105. In various embodiments, at operation 540, the NI 130 may filter through the CCLs based on one or more of density (e.g., selecting those having density in the middle 50% of CCL densities), height (e.g., selecting those having height in the top 10% of CCL heights), and/or area (e.g., selecting those having an area in the top 25% of CCL areas). In other embodiments, other techniques and/or thresholds for filtering may be utilized.

At operation 550, the NI 130 may then perform OCR on the CCLs to identify numbers in the CCLs. In various embodiments, various understood techniques for performing OCR on the CCLs may be utilized. Next, at operation 560, the NI 130 may remove incorrect values from the results of operation 550. For example, in some embodiments, at operation 560 the NI 130 may remove any non-numerical results which were identified at operation 550. In some embodiments, at operation 560, the NI 130 may remove numbers which fall outside of minimum or maximum values for the angular gauge 105, such as may be identified in the configuration information which was acquired during process 300 of FIG. 3. For example, if a gauge includes numbers, such as for aesthetic purposes, which may never actually be indicated by the gauge, those numbers may be removed at operation 560. After operation 560, the process may end.

Figure 6:
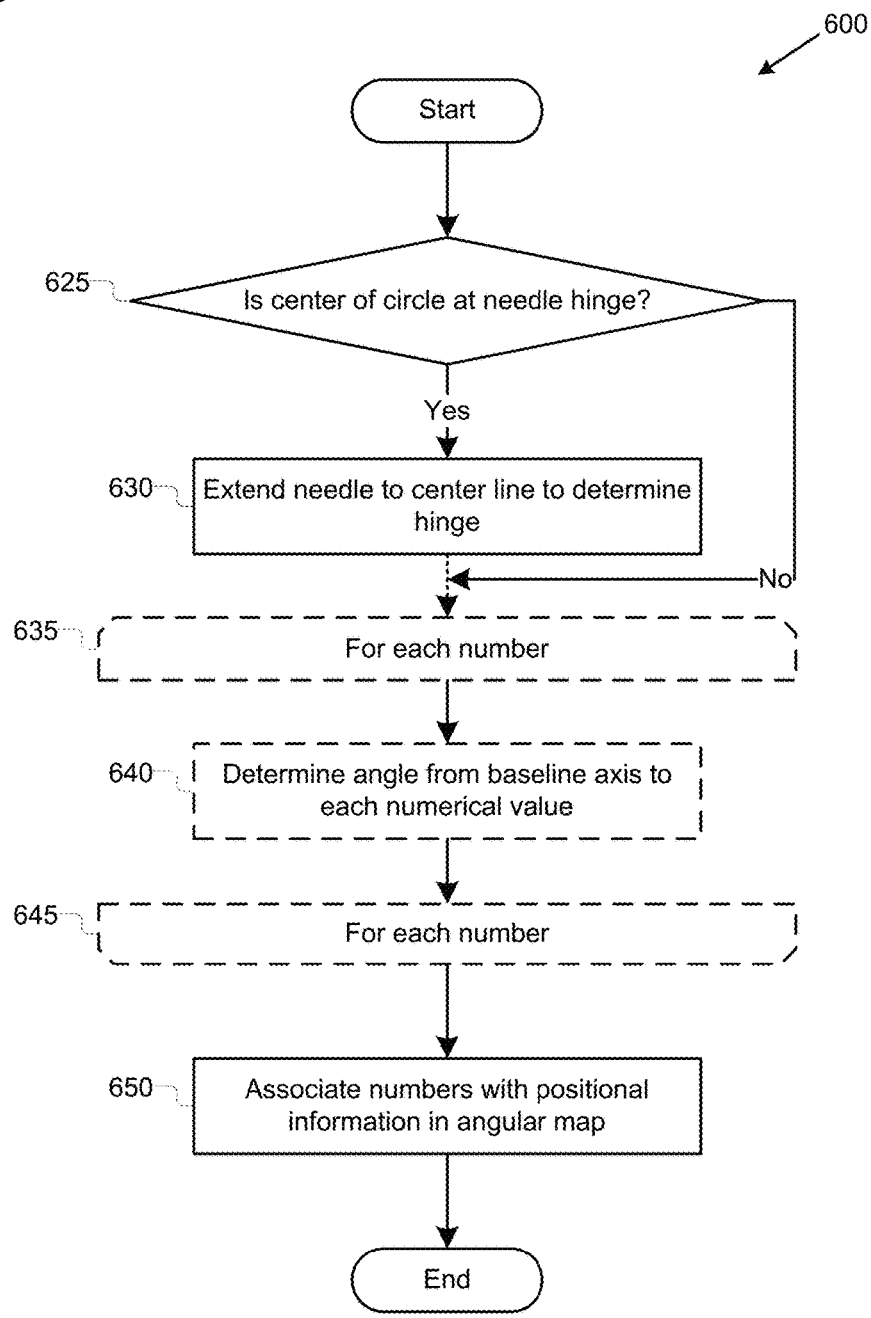
FIG. 6 illustrates an example process for generating an angular map for an angular gauge, in accordance with various embodiments.

Referring now to FIG. 6, an example process 600 for generating an angular map for an angular gauge is illustrated in accordance with various embodiments. In various embodiments, process 600 may be performed to implement, in whole or in part, operations 340 and 350 of process 300 of FIG. 3. While FIG. 6 illustrates particular operations in a particular order, in various embodiments the operations may be combined, split into parts, and/or omitted. The process may begin at decision operation 625, the AM 140 may determine whether the center of the circle identified by the IR 130 is at or near the hinge where the needle of the angular gauge 105 in the binary image 115. In various embodiments, this determination may be performed because the location of the hinge may be utilized for later determination of the needle angle. In various embodiments, the AM 140 may determine whether the center is at the hinge by determining whether the needle of the gauge crosses the identified center. In such embodiments, if the center is not located in the needle, the hinge may not be at the center of the image. In other embodiments, the AM 140 may determine that the needle passes within a particular distance from the center of the circle, such as, for example, within 10% of the center of the identified circle. In other embodiments, other techniques for determining if the needle hinge is at the center may be utilized. If, at decision operation 625, the center of the circle is determined to be at the needle hinge, the process may continue to optional operation 635. If, however, the center of the circle is determined not to be at the hinge point, then at operation 630 the needle may be extended to a line running through the center to determine a location for the hinge. In various embodiments, such a center line may run vertically through the center of the identified circle. However, in other embodiments, such as when the angular gauge hinge is not located below the center of the circle, the needle may be extended to a different line. For example, if the angular gauge 105 is oriented such that the hinge point is on the left side of the gauge, the needle may be extended to a horizontal line running through the center of the image. The process may then continue.

Next, at optional operations 635, 640 and 645, the AM may determine angles to associate with each number. Thus, at loop operation 635 a loop may begin for each number previously identified by the NI 130. At operation 640, an angle may be determined between a baseline axis running through the determined center or hinge point and a line running from the number to that center or hinge. In some embodiments, this baseline axis may be parallel to an x-axis for the binary image 125. In other embodiments, the baseline axis may be defined to correspond through a 0 value for the angular gauge. In yet other embodiments, the baseline axis may correspond to another value, such as a minimum or maximum value for the angular gauge 105. In various embodiments, the center may be used for this determination if it was previously determined that the center fell at or near the hinge of the needle. If it was determined that it did not, then the determined hinge point may be used. The loop may continue at operation 645 for the next identified number. It may be noted, however, that in some embodiments, operations 635, 640, and 645 may be skipped and no angles may be determined for the numbers and thus the angles may not be included in the angular map. Finally, at operation 650, positional information for the numbers, such as locations of the numbers on the binary image 125 and/or angles associate with the numbers may be associated with the numbers themselves in the angular map. The process may then end.

Figure 7:
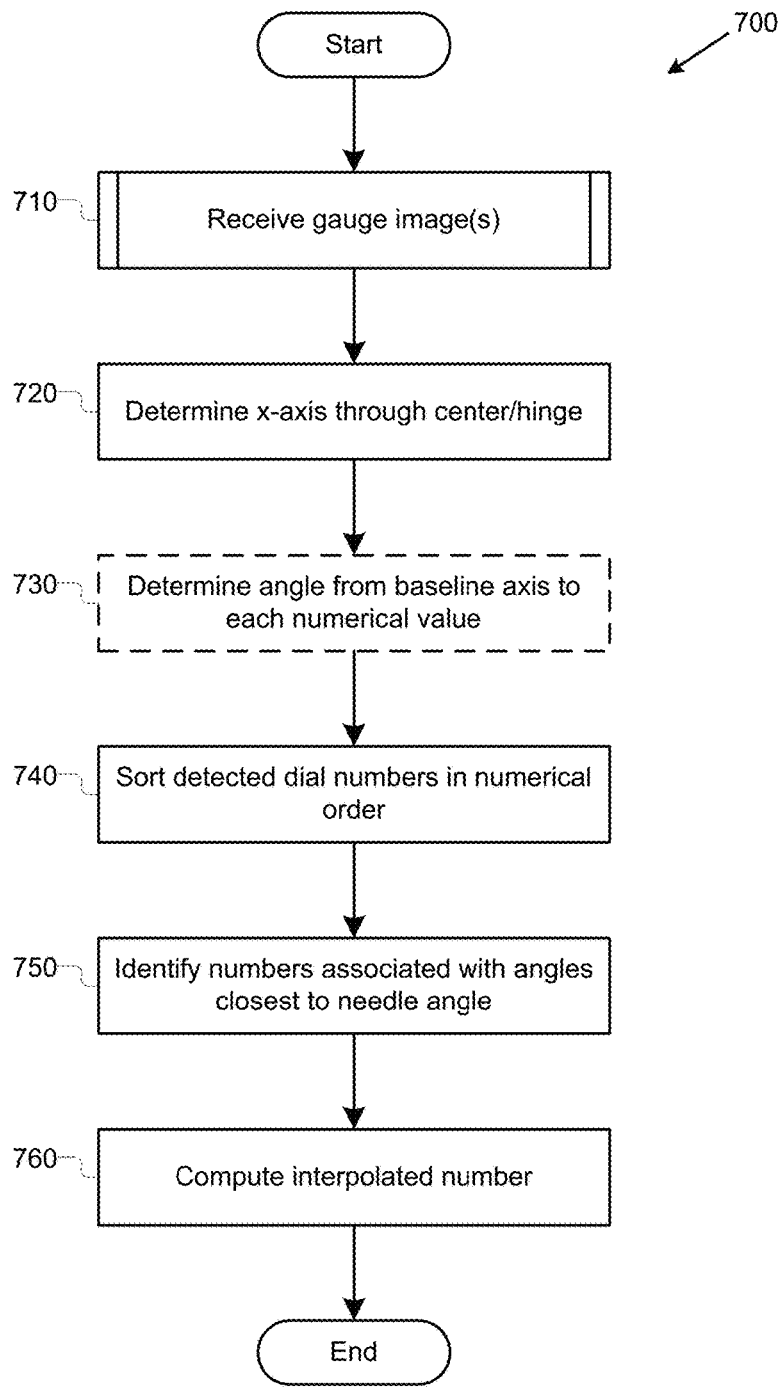
FIG. 7 illustrates a first example process for determining gauge values, in accordance with various embodiments.

Referring now to FIG. 7, a first example process 700 for determining displayed gauge values is illustrated in accordance with various embodiments. In various embodiments, process 700 may be performed to implement, in whole or in part, operation 240 of process 200 of FIG. 2. While FIG. 7 illustrates particular operations in a particular order, in various embodiments the operations may be combined, split into parts, and/or omitted. In various embodiments, the process of FIG. 8 may be performed in order to perform an angular interpolation between two numbers identified from the angular gauge 105.

The process may begin at operation 710, where the GR 150 may receive one or more current binary images 125 of the angular gauge 105, such as from the IR 120. Particular embodiments of the process of operation 710 may be described above with reference to process 400 of FIG. 4. Next, at operation 720, the GR 150 may determine a baseline axis through the center of the circle identified by the IR 130 or through the hinge point (depending on whether the center of the binary image 125 falls on or near the hinge point). As discussed above, in some embodiments, this baseline axis may be parallel to an x-axis, while in other embodiments, the baseline axis may be associated with a 0 value for the angular gauge or with a non-zero baseline value for the angular gauge 105. Next, at optional operation 730, the GR 150 may determine the corresponding angles of the numbers in the angular map 145 to the determined baseline axis at the center or hinge point. In various embodiments, if these angles were included in the angular map 145 by the AM 140, then operation 730 may not be performed. Next, at operation 740, the GR 150 may sort the numbers in numerical order. At operation 750, the GR 150 may then determine the current angle of the needle in binary image 125 and may determine the numbers with angles which are closest to the needle angle. With these two numbers being identified, at operation 760, the GR 150 may compute an interpolated value represented by the current location of the needle. In various embodiments, operation 760 may be performed through computation of the value:

$$v_{needle} = v_i + (|v_i - v_{i+1}|) \frac{\theta_{needle} - \theta_i}{|\theta_i - \theta_{i+1}|},$$

where $v_i$ and $v_{i+1}$ represent the values of the two identified numbers, respectively, $\theta$ and $\theta_{i+1}$ represent the angles associated with these numbers, respectively, $\theta_{needle}$ represents the angle of the needle, and $v_{needle}$ represents the determined value represented by the needle. It may be recognized that, in other embodiments, other techniques for interpolating the value may be utilized. After operation 760, the process may end.

Figure 8:
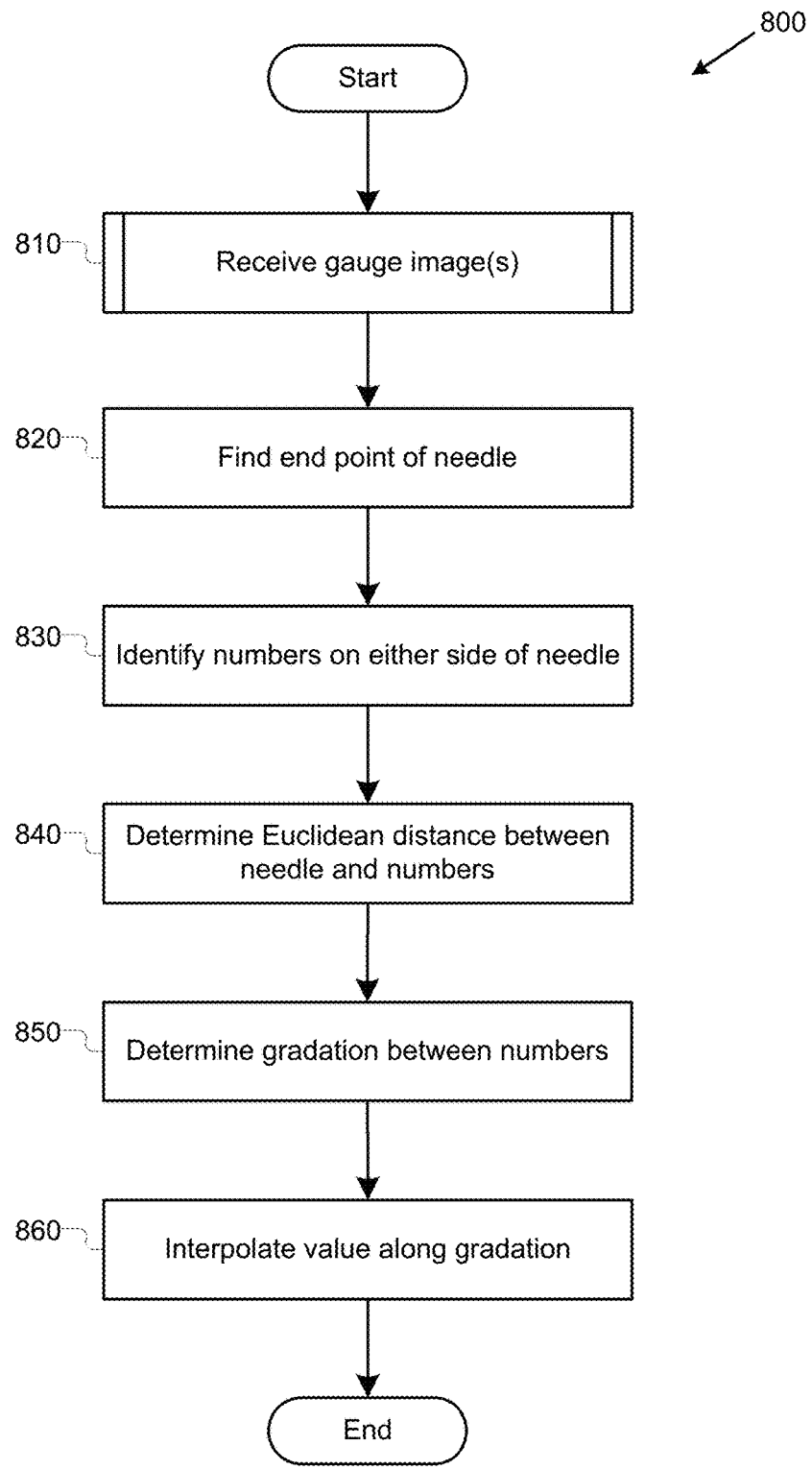
FIG. 8 illustrates a second example process for determining gauge values, in accordance with various embodiments.

Referring now to FIG. 8, a second example process 800 for determining gauge values is illustrated in accordance with various embodiments. In various embodiments, process 800 may be performed to implement, in whole or in part, operation 240 of process 200 of FIG. 2. While FIG. 8 illustrates particular operations in a particular order, in various embodiments the operations may be combined, split into parts, and/or omitted. In various embodiments, the process of FIG. 8 may be performed in order to perform a linear interpolation between two numbers identified from the angular gauge 105. The process may begin at operation 810, where the GR 150 may receive one or more current binary images 125 of the angular gauge 105, such as from the IR 120. Particular embodiments of the process of operation 810 may be described above with reference to process 400 of FIG. 4. Next, at operation 820, the GR 150 may find the end point of the needle in the binary image 125. At operation 830, the GR 150 may identify the two numbers on either side of the determined end of the needle. Next, at operation 840, the GR 150 may determine a Euclidean distance between the needle end and each of the identified numbers. At operation 850, the GR 150 may determine a gradation between the two numbers, such as along a line connecting the centers of the two numbers. Finally, at operation 860, the GR 160 may interpolate the value of the end of the needle using the two determined Euclidean distances. The process may then end.

Figure 9:
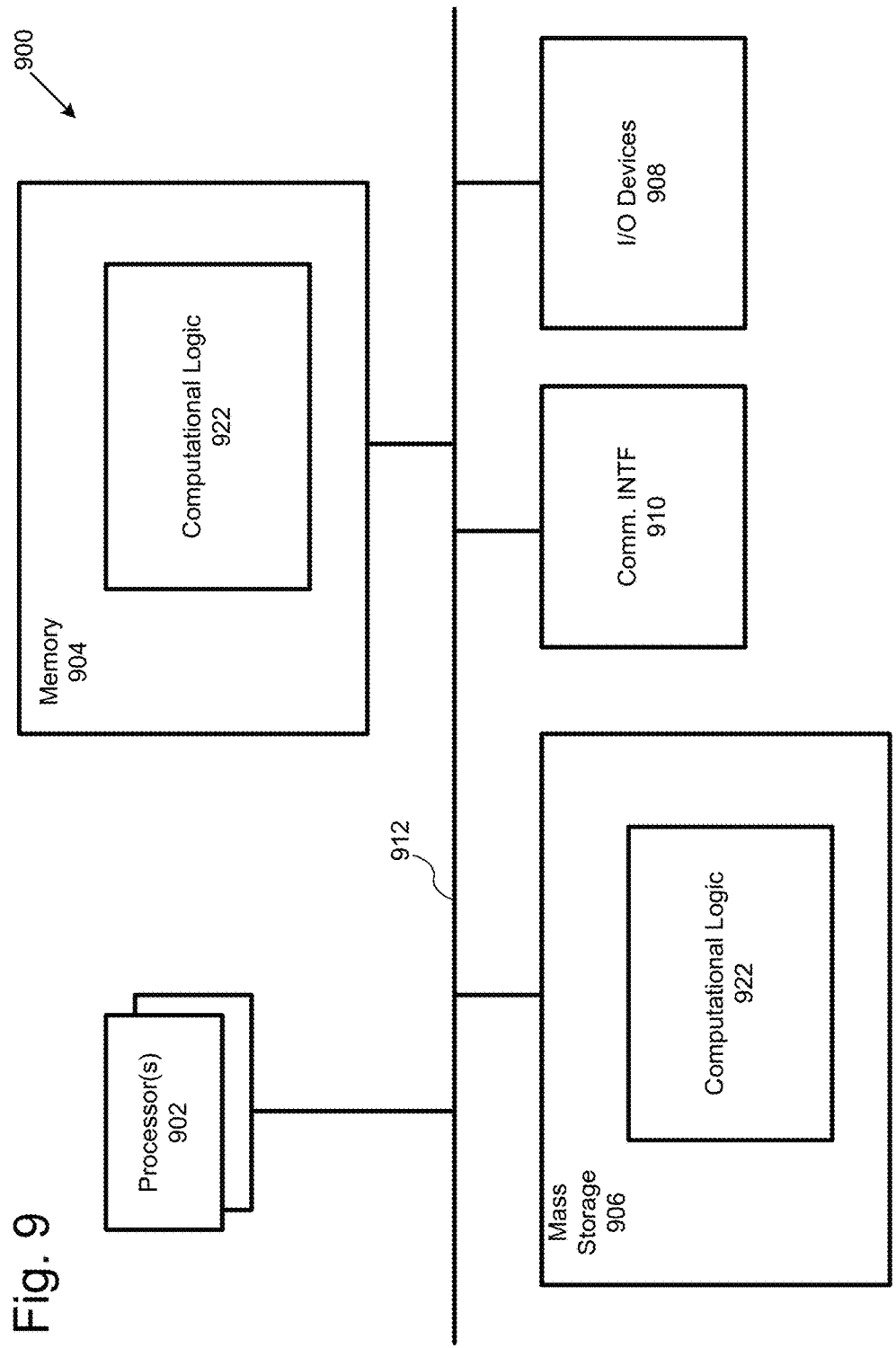
FIG. 9 illustrates an example computing environment suitable for practicing various aspects of the present disclosure, in accordance with various embodiments.

Referring now to FIG. 9, an example computer suitable for practicing various aspects of the present disclosure, including processes of FIGS. 2-8, is illustrated in accordance with various embodiments. As shown, computer 900 may include one or more processors or processor cores 902, and system memory 904. For the purpose of this application, including the claims, the terms "processor" and "processor cores" may be considered synonymous, unless the context clearly requires otherwise. Additionally, computer 900 may include mass storage devices 906 (such as diskette, hard drive, compact disc read only memory (CD-ROM) and so forth), input/output devices 908 (such as display, keyboard, cursor control, remote control, gaming controller, image capture device, and so forth) and communication interfaces 910 (such as network interface cards, modems, infrared receivers, radio transceivers (e.g., Bluetooth, Wi-Fi, Near Field Communications, Radio-frequency identification, and so forth). The elements may be coupled to each other via system bus 912, which may represent one or more buses. In the case of multiple buses, they may be bridged by one or more bus bridges (not shown).

Each of these elements may perform its conventional functions known in the art. In particular, system memory 904 and mass storage devices 906 may be employed to store a working copy and a permanent copy of the programming instructions implementing one or more of the operations associated with the angular gauge determination and reporting techniques described with references to FIGS. 2-8, collectively referred to as computing logic 922. The various elements may be implemented by assembler instructions supported by processor(s) 902 or high-level languages, such as, for example, C, that can be compiled into such instructions. In various embodiments, the system memory 904 or mass storage 906 may include various memory implementations, including integrated flash memory, such as in a System on a Chip, a USB flash drive, SD Card, on SATA SSD, etc.

The permanent copy of the programming instructions may be placed into permanent storage devices 906 in the factory, or in the field, through, for example, a distribution medium (not shown), such as a compact disc (CD), or through communication interface 910 (from a distribution server (not shown)). In embodiments, the programming instructions may be stored in one or more computer readable non-transitory storage media. In other embodiments, the programming instructions may be encoded in transitory storage media, such as signals.

The number, capability and/or capacity of these elements 910-912 may vary. Their constitutions are otherwise known, and accordingly will not be further described.

Figure 10:
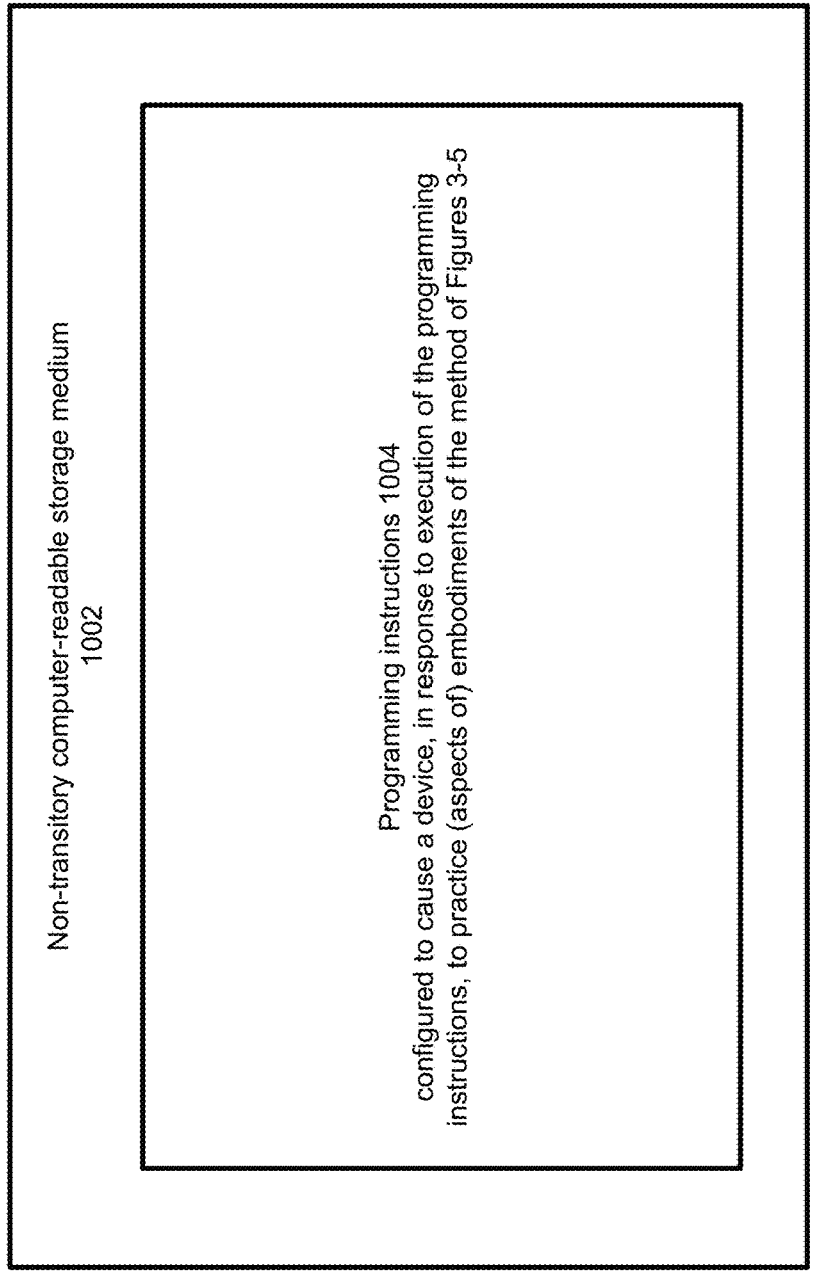
FIG. 10 illustrates an example storage medium with instructions configured to enable an apparatus to practice various aspects of the present disclosure, in accordance with various embodiments.

FIG. 10 illustrates an example least one computer-readable storage medium 1002 having instructions configured to practice all or selected ones of the operations associated with the techniques earlier described, in accordance with various embodiments. As illustrated, least one computer-readable storage medium 1002 may include a number of programming instructions 1004. Programming instructions 1004 may be configured to enable a device, e.g., computer 900, in response to execution of the programming instructions, to perform, e.g., various operations of processes of the figures described above, e.g., but not limited to, to the various operations performed to perform angular gauge determination techniques described herein In alternate embodiments, programming instructions 1004 may be disposed on multiple least one computer-readable storage media 1002 instead.

Referring back to FIG. 9, for one embodiment, at least one of processors 902 may be packaged together with a memory having computational logic 922 configured to practice aspects of processes of FIGS. 2-8. For one embodiment, at least one of processors 902 may be packaged together with a memory having computational logic 922 configured to practice aspects of processes of FIGS. 2-8 to form a System in Package (SiP). For one embodiment, at least one of processors 902 may be integrated on the same die with a memory having computational logic 922 configured to practice aspects of processes of FIGS. 2-8. For one embodiment, at least one of processors 902 may be packaged together with a memory having computational logic 922 configured to practice aspects of processes of FIGS. 2-8 to form a System on Chip (SoC). For at least one embodiment, the SoC may be utilized in, e.g., but not limited to, a computing tablet. (e.g., Wi-Fi, Blue Tooth, Blue Tooth Low Energy, Near Field Communications, Radio-frequency identification (RFID), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include an apparatus equipped to obtain values from an image of an angular gauge. The apparatus may include one or more computing processors. The apparatus may further include an angular mapper to operate on the one or more computing processors to generate an angular map from a first image of an angular gauge, wherein the angular map associates positions of a needle of the angular gauge with numerical values. The apparatus may further include a gauge reader to operate on the one or more computing processors to determine a value indicated by the needle of the angular gauge in a second image of the angular gauge based on the angular map.

Example 2 may include the apparatus of example 1, and may further include a number identifier to identify one or more numbers in the first image of the angular gauge.

Example 3 may include the apparatus of example 2, wherein the number identifier may be to identify the one or more numbers through identification of one or more connected component labels in the first image of the angular gauge.

Example 4 may include the apparatus of example 3, wherein the number identifier may be to identify a subset of connected component labels which may be most likely to contain gauge numbers.

Example 5 may include the apparatus of example 3, wherein the number identifier may be to group connected components into connected component labels.

Example 6 may include the apparatus of example 3, wherein the number identifier may be to perform optical character recognition on the connected component labels.

Example 7 may include the apparatus of any of examples 1-6, wherein the angular mapper may be to determine one or more of a maximum value and a minimum value for the angular gauge.

Example 8 may include the apparatus of example 7, wherein the angular mapper may be to determine one or more of the maximum value and the minimum value from configuration information for the angular gauge.

Example 9 may include the apparatus of example 8, wherein the angular mapper may be to obtain the configuration information from a configuration file for the angular gauge.

Example 10 may include the apparatus of any of examples 1-9, wherein the angular mapper may be to identify a center of the angular gauge.

Example 11 may include the apparatus of any of examples 1-10, wherein the angular mapper may be to generate the angular map to associate respective angles of the needle with respective numerical values.

Example 12 may include the apparatus of example 11, wherein the angular mapper may be to generate the angular map to associate respective angles of the needle through a center of the angular gauge.

Example 13 may include the apparatus of example 11, wherein the angular mapper may be to generate the angular map to associate respective angles based on angles of the needle when pointing at one or more identified numbers on the angular gauge.

Example 14 may include the apparatus of example 11, wherein the gauge reader may be to determine an angle of the needle of the angular gauge in the second image of the angular gauge and to determine the value associated with the angle of the needle in the second image.

Example 15 may include the apparatus of example 14, wherein, for an intermediate angle in between two angles which may be mapped in the angular map, the gauge reader may be to interpolate a value for the intermediate angle.

Example 16 may include the apparatus of example 11, wherein the angular mapper may be to generate the angular map to associate respective angles of the needle relative to a baseline axis.

Example 17 may include the apparatus of any of examples 1-16, and may further include a video or still image camera to capture images of the angular gauge.

Example 18 may include the apparatus of any of examples 1-17, and may further include an image receiver to receive still images or video of the angular gauge captured by a device other than the apparatus.

Example 19 may include the apparatus of any of examples 1-18, wherein the image receiver may be to isolate one or more still images from a video captured of the angular gauge.

Example 20 may include a computer-implemented method for obtaining values from an image of an angular gauge. The method may include generating, by a computing system, an angular map from a first image of an angular gauge, wherein the angular map associates positions of a needle of the angular gauge with numerical values. The method may further include determining, by the computing system, a value indicated by the needle of the angular gauge in a second image of the angular gauge based on the angular map.

Example 21 may include the method of example 20, and may further include identifying, by the computing system, one or more numbers in the first image of the angular gauge.

Example 22 may include the method of example 21, wherein identifying one or more numbers may include identifying one or more connected component labels in the first image of the angular gauge.

Example 23 may include the method of example 22, wherein identifying one or more connected component labels may include identifying a subset of connected component labels which may be most likely to contain gauge numbers.

Example 24 may include the method of example 22, wherein identifying one or more connected component labels may include grouping connected components into connected component labels.

Example 25 may include the method of example 22, wherein identifying one or more numbers may include performing optical character recognition on the connected component labels.

Example 26 may include the method of any of examples 20-25, and may further include determining, by the computing system, one or more of a maximum value and a minimum value for the angular gauge.

Example 27 may include the method of example 26, wherein determining one or more of the maximum value and the minimum value may include determining one or more of the maximum value and the minimum value from configuration information for the angular gauge.

Example 28 may include the method of example 27, and may further include obtaining, by the computing system, the configuration information from a configuration file for the angular gauge.

Example 29 may include the method of any of examples 20-28, and may further include identifying, by the computing system, a center of the angular gauge.

Example 30 may include the method of any of examples 20-29, wherein generating the angular map may include associating respective angles of the needle with respective numerical values.

Example 31 may include the method of example 30, wherein associating respective angles of the needle may include associating respective angles through a center of the angular gauge.

Example 32 may include the method of example 30, wherein associating respective angles may include associating respective angles based on angles of the needle when pointing at one or more identified numbers on the angular gauge.

Example 33 may include the method of example 30, wherein determining a value may include determining an angle of the needle of the angular gauge in the second image of the angular gauge and determining the value associated with the angle of the needle in the second image.

Example 34 may include the method of example 33, wherein, for an intermediate angle in between two angles which may be mapped in the angular map, determining a value may include interpolating a value for the intermediate angle.

Example 35 may include the method of example 30, wherein associating respective angles may include associating respective angles of the needle relative to a baseline axis.

Example 36 may include the method of any of examples 20-35, and may further include capturing images of the angular gauge.

Example 37 may include the method of any of examples 20-36, and may further include receiving still images or video of the angular gauge captured by a device other than the apparatus.

Example 38 may include the method of any of examples 20-37, and may further include isolating one or more still images from a video captured of the angular gauge.

Example 39 may include one or more computer-readable media containing instructions written thereon that, in response to execution on a computing system, cause the computing system to obtain values from an image of an angular gauge by causing the computing system to: generate an angular map from a first image of an angular gauge, wherein the angular map associates positions of a needle of the angular gauge with numerical values; and to determine a value indicated by the needle of the angular gauge in a second image of the angular gauge based on the angular map.

Example 40 may include the computer-readable media of example 39, wherein the instructions may be further to identify one or more numbers in the first image of the angular gauge.

Example 41 may include the computer-readable media of example 40, wherein identify one or more numbers may include identify one or more connected component labels in the first image of the angular gauge.

Example 42 may include the computer-readable media of example 41, wherein identify one or more connected component labels may include identify a subset of connected component labels which may be most likely to contain gauge numbers.

Example 43 may include the computer-readable media of example 41, wherein identify one or more connected component labels may include group connected components into connected component labels.

Example 44 may include the computer-readable media of example 41, wherein identify one or more numbers may include perform optical character recognition on the connected component labels.

Example 45 may include the computer-readable media of any of examples 39-44, wherein the instructions may be further to determine one or more of a maximum value and a minimum value for the angular gauge.

Example 46 may include the computer-readable media of example 45, wherein determine one or more of the maximum value and the minimum value may include determine one or more of the maximum value and the minimum value from configuration information for the angular gauge.

Example 47 may include the computer-readable media of example 46, wherein the instructions may be further to obtain the configuration information from a configuration file for the angular gauge.

Example 48 may include the computer-readable media of any of examples 39-47, wherein the instructions may be further to identify a center of the angular gauge.

Example 49 may include the computer-readable media of any of examples 39-48, wherein generate the angular map may include associate respective angles of the needle with respective numerical values.

Example 50 may include the computer-readable media of example 49, wherein associate respective angles of the needle may include associate respective angles through a center of the angular gauge.

Example 51 may include the computer-readable media of example 49, wherein associate respective angles may include associate respective angles based on angles of the needle when pointing at one or more identified numbers on the angular gauge.

Example 52 may include the computer-readable media of example 49, wherein determine a value may include determine an angle of the needle of the angular gauge in the second image of the angular gauge and determine the value associated with the angle of the needle in the second image.

Example 53 may include the computer-readable media of example 52, wherein, for an intermediate angle in between two angles which may be mapped in the angular map, determine a value may include interpolate a value for the intermediate angle.

Example 54 may include the computer-readable media of example 49, wherein associate respective angles may include associate respective angles of the needle relative to a baseline axis.

Example 55 may include the computer-readable media of any of examples 39-54, wherein the instructions may be further to capture images of the angular gauge.

Example 56 may include the computer-readable media of any of examples 39-55, wherein the instructions may be further to receive still images or video of the angular gauge captured by a device other than the apparatus.

Example 57 may include the computer-readable media of any of examples 39-56, wherein the instructions may be further to isolate one or more still images from a video captured of the angular gauge.

Example 58 may include an apparatus for obtaining values from an image of an angular gauge. The apparatus may include means for generating an angular map from a first image of an angular gauge, wherein the angular map associates positions of a needle of the angular gauge with numerical values. The apparatus may further include means for determining a value indicated by the needle of the angular gauge in a second image of the angular gauge based on the angular map.

Example 59 may include the apparatus of example 58, and may further include means for identifying one or more numbers in the first image of the angular gauge.

Example 60 may include the apparatus of example 59, wherein means for identifying one or more numbers may include means for identifying one or more connected component labels in the first image of the angular gauge.

Example 61 may include the apparatus of example 60, wherein means for identifying one or more connected component labels may include means for identifying a subset of connected component labels which may be most likely to contain gauge numbers.

Example 62 may include the apparatus of example 60, wherein means for identifying one or more connected component labels may include means for grouping connected components into connected component labels.

Example 63 may include the apparatus of example 60, wherein means for identifying one or more numbers may include means for performing optical character recognition on the connected component labels.

Example 64 may include the apparatus of any of examples 58-63, and may further include means for determining one or more of a maximum value and a minimum value for the angular gauge.

Example 65 may include the apparatus of example 64, wherein means for determining one or more of the maximum value and the minimum value may include means for determining one or more of the maximum value and the minimum value from configuration information for the angular gauge.

Example 66 may include the apparatus of example 65, and may further include means for obtaining the configuration information from a configuration file for the angular gauge.

Example 67 may include the apparatus of any of examples 58-66, and may further include means for identifying a center of the angular gauge.

Example 68 may include the apparatus of any of examples 58-67, wherein means for generating the angular map may include means for associating respective angles of the needle with respective numerical values.

Example 69 may include the apparatus of example 68, wherein means for associating respective angles of the needle may include means for associating respective angles through a center of the angular gauge.

Example 70 may include the apparatus of example 68, wherein means for associating respective angles may include means for associating respective angles based on angles of the needle when pointing at one or more identified numbers on the angular gauge.

Example 71 may include the apparatus of example 68, wherein means for determining a value may include means for determining an angle of the needle of the angular gauge in the second image of the angular gauge and means for determining the value associated with the angle of the needle in the second image.

Example 72 may include the apparatus of example 71, wherein, for an intermediate angle in between two angles which may be mapped in the angular map, means for determining a value may include means for interpolating a value for the intermediate angle.

Example 73 may include the apparatus of example 68, wherein means for associating respective angles may include means for associating respective angles of the needle relative to a baseline axis.

Example 74 may include the apparatus of any of examples 58-73, and may further include means for capturing images of the angular gauge.

Example 75 may include the apparatus of any of examples 58-74, and may further include means for receiving still images or video of the angular gauge captured by a device other than the apparatus.

Example 76 may include the apparatus of any of examples 58-75, and may further include means for isolating one or more still images from a video captured of the angular gauge.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:
1. An apparatus, comprising:
   one or more computing processors;
   an image receiver to generate a binary image from a first image of an angular gauge, identify a portion of the binary image containing the angular gauge, and crop the binary image to the identified portion to generate a cropped binary image;

an angular mapper to operate on the one or more computing processors to generate an angular map from the cropped binary image, wherein the angular map associates positions of a needle of the angular gauge with numerical values; and a gauge reader to operate on the one or more computing processors to determine a value indicated by the needle of the angular gauge in a second image of the angular gauge based on the angular map;

wherein, for an intermediate angle in between two angles which are mapped in the angular map, the gauge reader is to interpolate a value for the intermediate angle from the two mapped angles, the two mapped angles being mapped angles closest to the intermediate angle.

2. The apparatus of claim 1, further comprising a number identifier to identify one or more numbers in the first image of the angular gauge.

3. The apparatus of claim 2, wherein the number identifier is to identify the one or more numbers through identification of one or more connected component labels in the first image of the angular gauge.

4. The apparatus of claim 3, wherein the number identifier is to identify a subset of connected component labels which are most likely to contain gauge numbers.

5. The apparatus of claim 3, wherein the number identifier is to group connected components into connected component labels.

6. The apparatus of claim 3, wherein the number identifier is to perform optical character recognition on the connected component labels.

7. The apparatus of claim 1, wherein the angular mapper is to determine one or more of a maximum value and a minimum value for the angular gauge.

8. The apparatus of claim 7, wherein the angular mapper is to determine one or more of the maximum value and the minimum value from configuration information for the angular gauge.

9. The apparatus of claim 1, wherein the angular mapper is to identify a center of the angular gauge.

10. The apparatus of claim 1, wherein the angular mapper is to generate the angular map to associate respective angles of the needle with respective numerical values.

11. The apparatus of claim 10, wherein the angular mapper is to generate the angular map to associate respective angles of the needle through a center of the angular gauge.

12. The apparatus of claim 10, wherein the angular mapper is to generate the angular map to associate respective angles based on angles of the needle when pointing at one or more identified numbers on the angular gauge.

13. The apparatus of claim 10, wherein the gauge reader is to:
determine an angle of the needle of the angular gauge in the second image of the angular gauge; and
determine the value associated with the angle of the needle in the second image.

14. The apparatus of claim 10, wherein the angular mapper is to generate the angular map to associate respective angles of the needle relative to a baseline axis.

15. A computer-implemented method, comprising:
generating, by a computing system, a binary image from a first image of an angular gauge;
identifying, by the computing system, a portion of the binary image containing the angular gauge;
generating, by the computing system, a cropped binary image by cropping the binary image to the identified portion;
generating, by the computing system, an angular map from the cropped binary image, wherein the angular map associates positions of a needle of the angular gauge with numerical values;
determining, by the computing system, a value indicated by the needle of the angular gauge in a second image of the angular gauge based on the angular map; and
interpolating, for an intermediate angle in between two angles which are mapped in the angular map, a value for the intermediate angle from the two mapped angles, the two mapped angles being mapped angles closest to the intermediate angle.

16. The method of claim 15, further comprising identifying, by the computing system, one or more numbers in the first image of the angular gauge.

17. The method of claim 15, wherein generating the angular map comprises associating respective angles of the needle with respective numerical values.

18. The method of claim 17, wherein determining a value comprises:
determining an angle of the needle of the angular gauge in the second image of the angular gauge; and
determining the value associated with the angle of the needle in the second image.

19. One or more non-transitory computer-readable media containing instructions written thereon that, in response to execution on a computing system, cause the computing system to:
generate a binary image from a first image of an angular gauge;
identify a portion of the binary image containing the angular gauge;
generate a cropped binary image by cropping the binary image to the identified portion;
generate an angular map from the cropped binary image, wherein the angular map associates positions of a needle of the angular gauge with numerical values;
determine a value indicated by the needle of the angular gauge in a second image of the angular gauge based on the angular map; and
interpolate, for an intermediate angle in between two angles which are mapped in the angular map, a value for the intermediate angle from the two mapped angles, the two mapped angles being mapped angles closest to the intermediate angle.

20. The computer-readable media of claim 19, wherein the instructions are further to identify one or more numbers in the first image of the angular gauge.

21. The computer-readable media of claim 19, wherein the instructions are further to identify a center of the angular gauge.

22. The computer-readable media of claim 19, wherein generate the angular map comprises associate respective angles of the needle with respective numerical values.

23. The computer-readable media of claim 22, wherein associate respective angles of the needle comprises associate respective angles through a center of the angular gauge.

24. The computer-readable media of claim 22, wherein determine a value comprises:
determine an angle of the needle of the angular gauge in the second image of the angular gauge; and
determine the value associated with the angle of the needle in the second image.

* * * * *